(12) United States Patent
McAllister et al.

(10) Patent No.: US 6,600,616 B2
(45) Date of Patent: Jul. 29, 2003

(54) METHOD FOR REDUCTION OF OFF-TRACK ERRORS OR WRITE FAILURES IN DATA STORAGE TAPE SYSTEMS

(75) Inventors: Jeffrey S. McAllister, Boise, ID (US); Donald J. Fasen, Boise, ID (US); Paul F. Bartlett, Bristol (GB); Robert M. Jackson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 203 days.

(21) Appl. No.: 09/843,129

(22) Filed: Apr. 25, 2001

(65) Prior Publication Data

US 2002/0159180 A1 Oct. 31, 2002

(51) Int. Cl.⁷ ................................................. G11B 15/04
(52) U.S. Cl. ..................... 360/60; 360/73.04; 360/77.12
(58) Field of Search ............................... 360/60, 73.04, 360/77.12, 73.06, 73.07

(56) References Cited

U.S. PATENT DOCUMENTS

| | | | |
|---|---|---|---|
| 5,742,444 A | * | 4/1998 | Ozue ........................ 360/60 |
| 5,764,430 A | | 6/1998 | Ottesen |
| 5,892,633 A | | 4/1999 | Ayres et al. |
| 5,898,534 A | | 4/1999 | Gray |
| 5,995,317 A | | 11/1999 | Ottesen |
| 6,049,441 A | | 4/2000 | Ottesen |
| 6,067,203 A | | 5/2000 | Ottesen |
| 6,172,835 B1 | | 1/2001 | Nonoyama |
| 6,449,114 B1 | * | 9/2002 | Nagasawa ................. 360/69 |
| 2002/0191321 A1 | * | 12/2002 | Anderson ................. 360/60 |

OTHER PUBLICATIONS

Partial printout of http://www.Itotechnology.com/about.html website dated Mar. 8, 2001.*

* cited by examiner

Primary Examiner—Alan T. Faber

(57) ABSTRACT

Embodiments of a data storage tape control system and methods are disclosed that may work to correct off-track errors, reduce the frequency of off-track errors, and/or reduce the negative effects of off-track errors in writing performance. The invented method slows tape speed in response to off-track errors, preferably by continuously decelerating while attempting writing multiple retries. The invented method helps prevent further off-track errors and the resulting frequent interruptions of writing, by helping improve head placement accuracy. Once a selected amount of data is written, for example, a standard data-set or other block of data, the tape speed optionally may be accelerated to the original target speed. While the average tape speed may be reduced during the invented writing procedure, the overall efficiency of writing may be increased compared to an operation in which off-track errors and writing failures occur repeatedly because of high tape speeds.

20 Claims, 4 Drawing Sheets

METHOD FOR REDUCTION OF OFF-TRACK ERRORS OR WRITE FAILURES IN DATA STORAGE TAPE SYSTEMS

FIELD OF THE INVENTION

This invention relates generally to tape systems for data storage and retrieval. More specifically, the invention relates to methods of improving data storage, and, specifically, the writing operation. The invention provides methods for minimizing the effect of off-track errors.

RELATED ART

Various computer data storage tape systems are well known. Tape systems are commonly used for data protection backup of computer files, and for dumping entire hard drive contents to a tape for backup and archiving. One category of such systems is the linear tape system, a subset of which subscribes to the "LTO standards" (Linear Tape Organization standards). The LTO standards define requirements for hardware and software to enable universal use of standard tapes on LTO equipment produced by various manufacturers. LTO tape 10 is approximately ½ inch in width. Eight channel LTO tape has 384 tracks, readable and writeable by a head 12 with eight read/write elements 14.

Schematics and information describing LTO technology are available in patent literature and at the website ltotechnology.com. The tape and writing head of a conventional LTO system is schematically portrayed in FIG. 1. The eight read/write elements 14 in a conventional LTO system may simultaneously write or read eight tracks at a time all along the length of the tape 10, which is typically 600 meters long. After reaching the end of the tape 10, the head 12 is moved slightly, and the tape 10 is run in reverse. The position of the head 12 on the tape 10 is controlled in relationship to servo bands 16 on the tape that each contains six sub-bands. Also, the head 12 has two possible positions for each of the sub-bands within each of the servo bands. As a result, the tape has a total of (8×4×6×2)=384 tracks for reading and writing.

Conventional linear tape systems have a maximum write and read speed, typically in the range of 2–8 meters/second, and, in the preferred embodiment herein, about 4.1 meters/second (m/s). The linear tape travels at this speed through guides between two spools. Due to external vibrations, internal inconsistencies in tape, spool, or guide manufacture, and inconsistencies in the wrapping of tape around itself on the spool, the tape sometimes wanders transversely, relative to the writing head, so that centers of the tracks move transversely from the writing elements. This is called "going off-track." These off-track events typically repeat themselves and frequently grow to a magnitude that results, if writing continues, in overwriting of another track or in the data not being found when it is to be read. Most conventional tape systems, therefore, are designed to react quickly when there is an "off-track error," that is, when the head reaches an "off-track limit" that represents a certain distance from the center of the track. This off-track limit is predetermined, by the manufacturer/programmer, to be the limit between the area in which writing may be done properly and the area in which writing is not acceptable because of the possibility/probability of overwriting or unreadable writing. The off-track limit, in terms of microns transversely off of center-track, is set at different locations by various manufacturers, preferably in the range of about 10–20% of the track width. For a track having a 28-micron width, the off-track error limit may be set, for example, at about 3 microns, or another limit within the preferred 10–20% range.

The off-track sensing system of a conventional tape system cooperates with the closed-loop head-positioning servo control system. The head monitors its position relative to the servo bands, and so, in effect, monitors the position of the writing elements relative to the centers of the tracks. When the head reaches the off-track limit, meaning that the individual elements are an off-track relative to their respective track centers, an error is signaled. The conventional tape system controller then turns off the writing function while the tape continues to travel at the normal maximum speed, and waits until the head is back "on track," that is, within the acceptable position limits. Once the sensing system indicates that there is no longer an off-track error, writing is started again.

Each time an off-track error occurs, the process is repeated. If there are tape, reel, tape wrapping, or vibration problems inherent in the tape system or in the external environment, off-track errors may repeat frequently. In such a case, the conventional tape system repeatedly "retries" the writing, that is, shuts off the writing function, advances the tape until the off-track error ends, and starts writing again until another off-track error signal occurs, all at the normal, maximum tape speed. Optionally, conventional retries may include reversing the tape to backup to a position on the tape where writing stopped, but such methods add complexity and waste time. If repeated off-track errors continue to interrupt writing for an extended period of time, the tape may travel a long distance without a significant amount of successful writing. Therefore, to prevent endless unsuccessful attempts at writing, the conventional tape controller stops this retry process if a certain amount of writing has not been done successfully within a certain length of tape. Typically, if a data-set, which is the smallest block of data to be written (typically 100–110 mm of writing), has not been written in a certain total length of tape (typically 4 meters), the controller will stop the process, without any more retries, and signal a write failure.

Some tape speed control systems for linear tape have been developed that may adjust tape speed in order to match the speed of data coming from the host computer. Such systems prevent frequent stops and starts of the tape writing process when the tape speed is ahead of the data delivery speed from the host computer. In systems using such a host-matching speed control system, the speed at which writing, tape advancement, and retries are conducted is the "maximum target speed," which is set in response to the host data transfer rate. In such systems, therefore, the target speed may not be the system's highest possible speed, but rather a speed set as a function of the host computer's operation. Patents that discuss speed control include U.S. Pat. No. 5,892,633 (Ayres, et al.); U.S. Pat. No. 5,764,430 (Ottesen, et al.); and U.S. Pat. No. 6,067,203 (Ottesen, et al.).

Still, there is a need for improved tape writing and reading performance. There is a need for off-track error reduction and improved methods for correction/control of off-track errors. The present invention addresses these needs.

SUMMARY OF THE INVENTION

The present invention comprises a method of reducing the negative effects of off-track errors in data storage tape systems, by helping to limit the frequency of off-track errors. The present invention reduces tape speed in response to an off-track error during writing of a data-set on a tape, which action tends to correct the error and reduce the recurrence of off-track errors. Overall, the present invention tends to increase successful writing and to reduce failed writing.

Additionally, the invention may comprise apparatus for implementing the preferred methods, comprising a system for controlling tape speed in response to off-track errors. In some embodiments, the controller stops writing in response to an off-track error, reduces tape speed incrementally, and then resumes writing after the incremental reduction, assuming the writing head has gone back on-track. In especially-preferred embodiments, the controller stops writing in response to an off-track error, reduces tape speed continuously, and resumes writing as soon as the head goes back on-track, which is normally during the speed reduction. The invention may also comprise methods and apparatus for accelerating tape speed at desired times or after desired events, for example, after a data-set is successfully written.

DETAILED DESCRIPTION OF THE INVENTION

Figure 1:
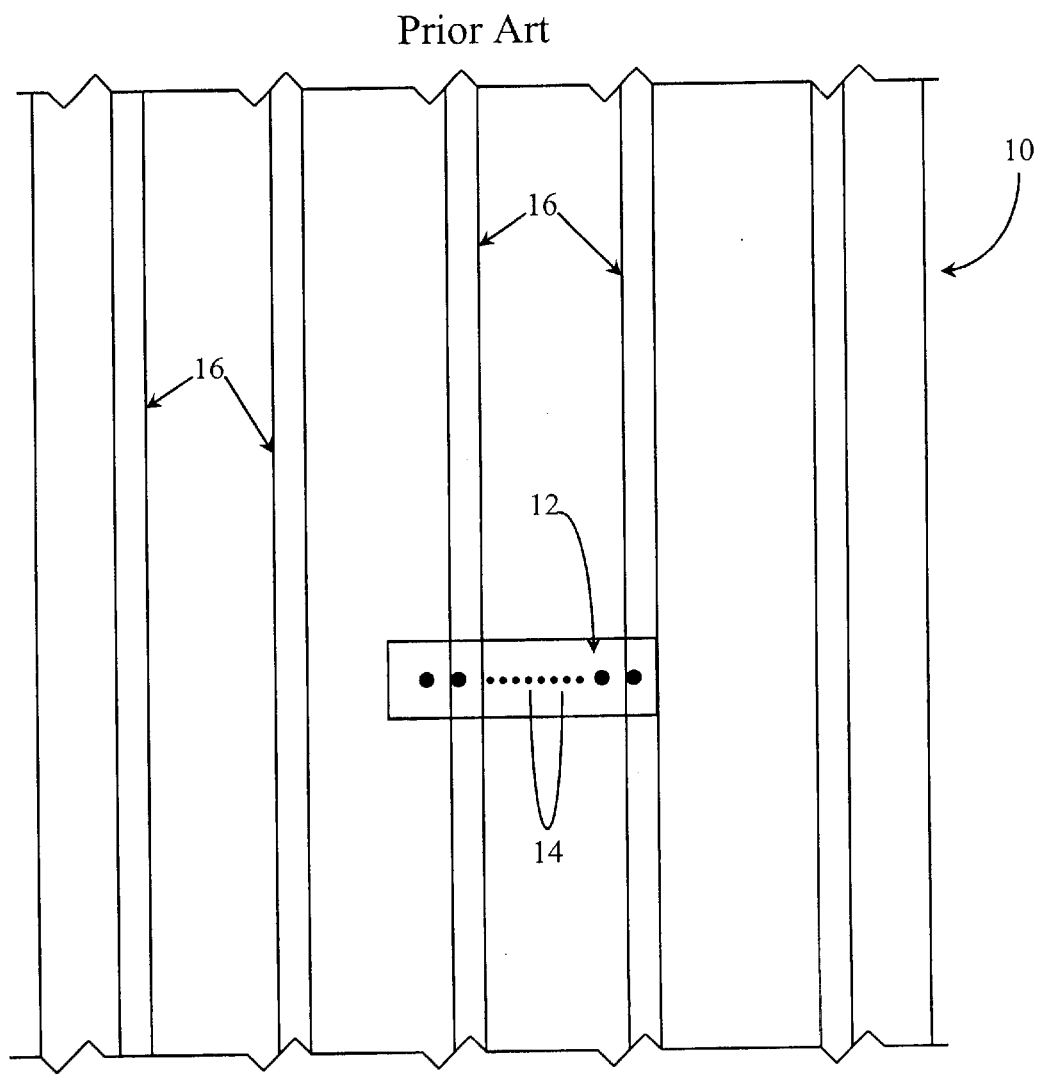
FIG. 1 is a schematic plan view of a portion of a prior art linear tape with a writing head positioned over the tape to write with its eight writing elements.
Figure 2:
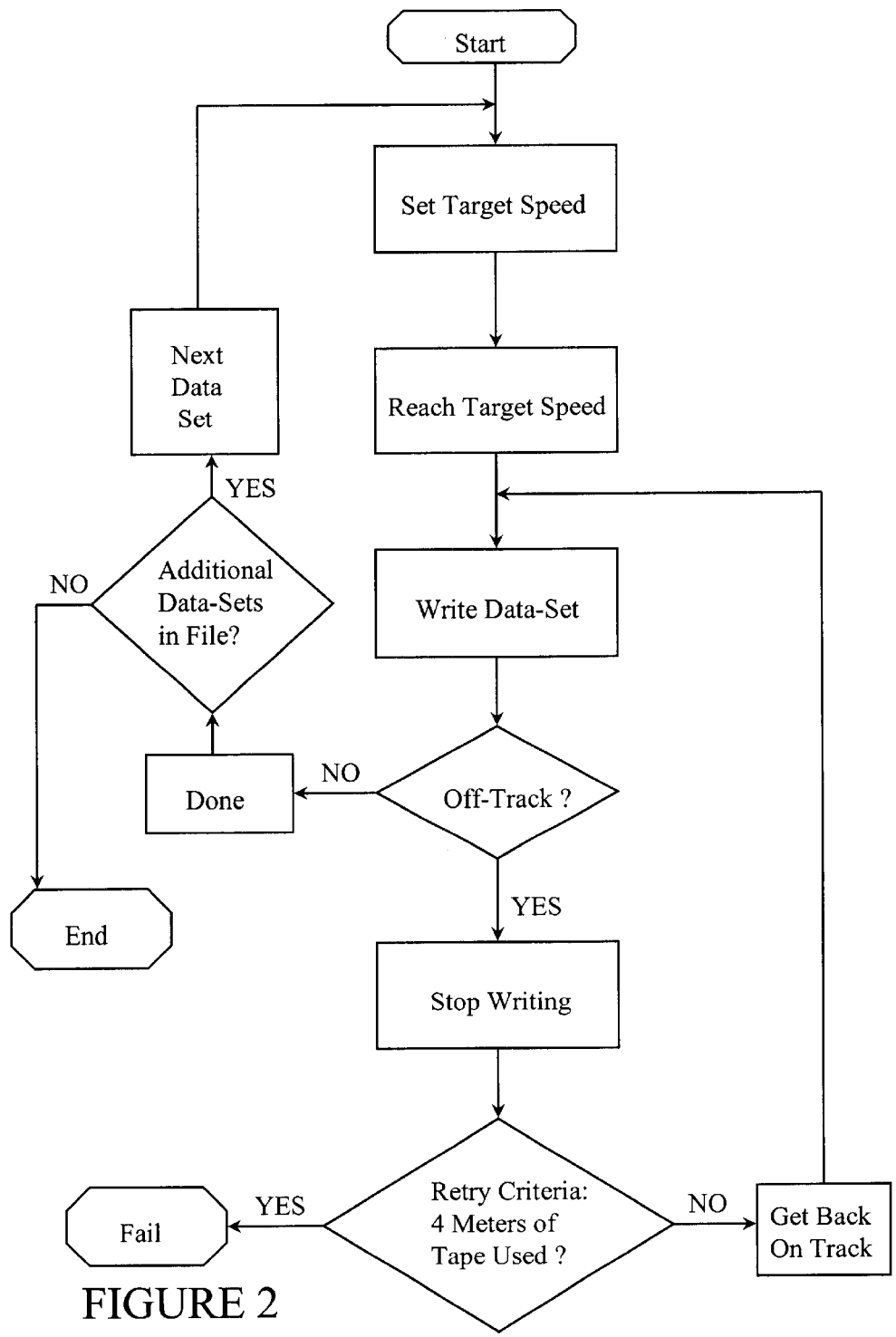
FIG. 2 is a flow diagram of steps in a conventional tape system control scheme for responding to off-track errors.
Figure 3:
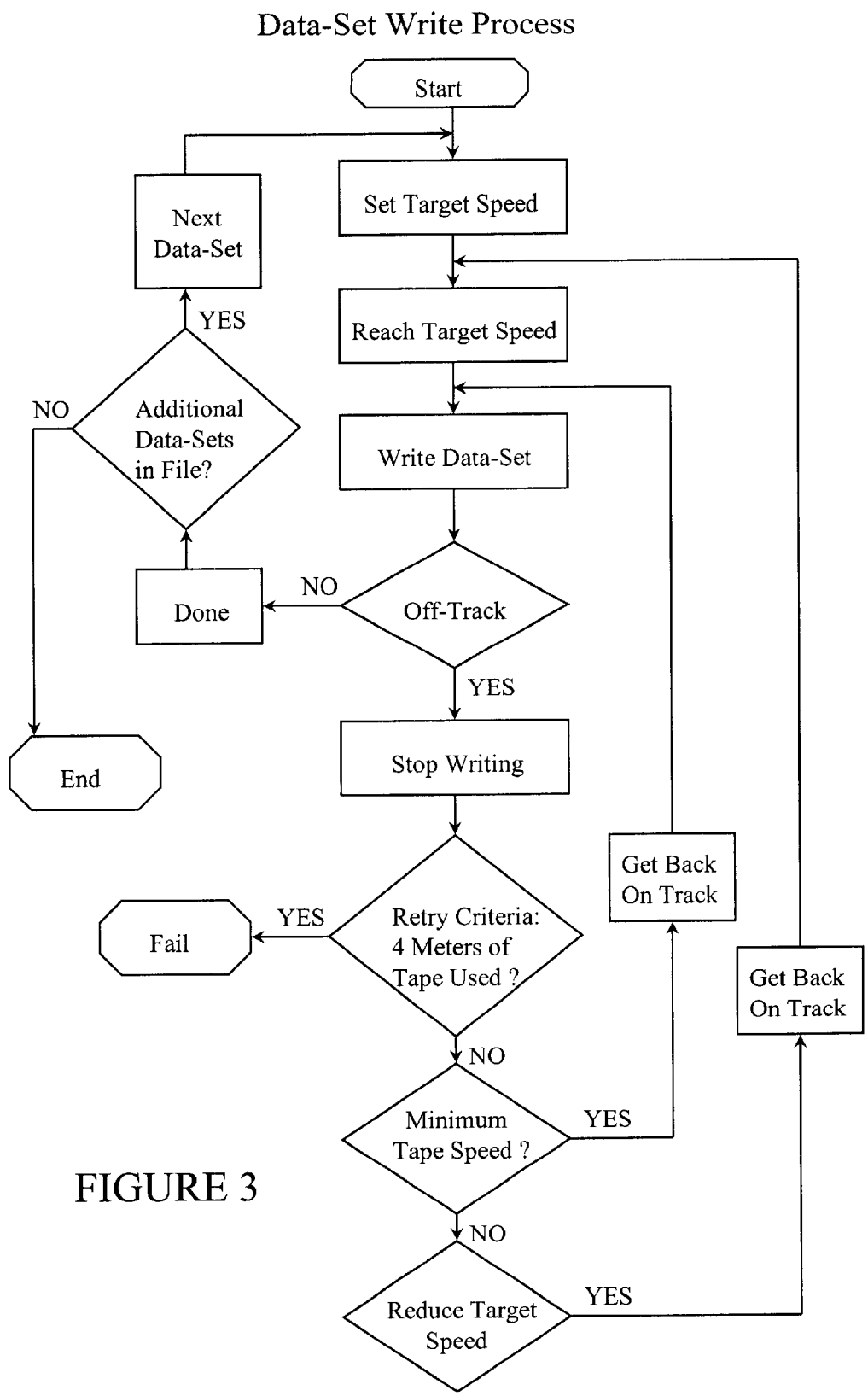
FIG. 3 is a flow diagram of steps in one embodiment of the invention for writing a data-set in a data storage tape system, wherein tape speed is lowered in increments when off-track errors are sensed, and writing commences at the reduced speed.
Figure 4:
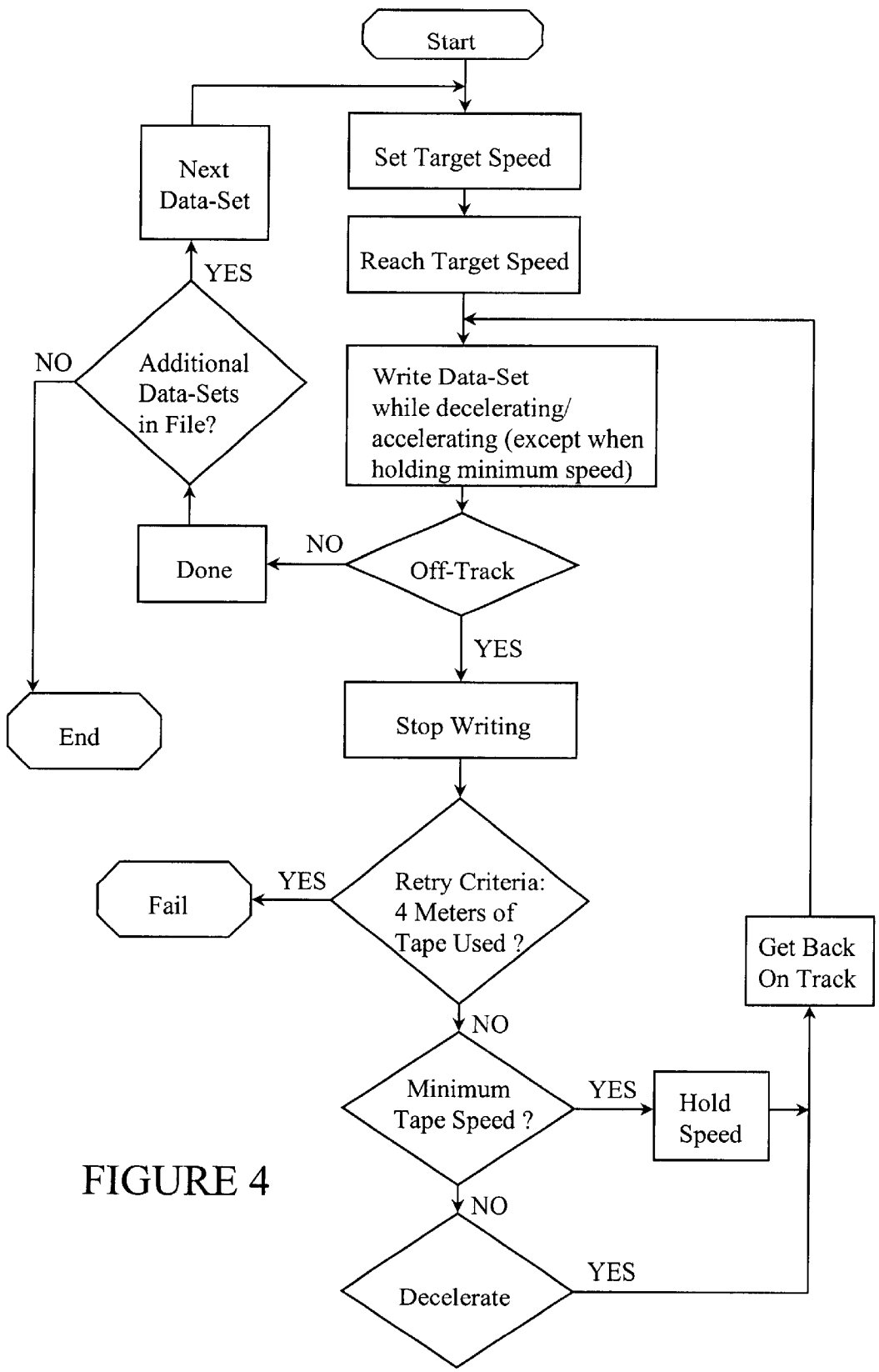
FIG. 4 is a flow diagram of an alternative, especially-preferred embodiment of the invented method for writing a data-set, in which writing is stopped when an off-track error occurs, and speed reduction (deceleration) begins immediately and continues while writing of the data-set resumes.

Referring to the drawings, there are shown several, but not the only, embodiments of the invented method for reduction of off-track errors or write failures in data storage tape systems. FIGS. 1 and 2 illustrate prior art tape equipment and controller methods. FIGS. 3 and 4 illustrate embodiments of the data-set write process according to the invention.

As discussed in the Related Art section, prior art systems stop writing when an off-track error occurs but continue tape advancement at a maximum target speed while the writing head corrects its position and while the writing is retried. In the prior art, the target speed may be set as the maximum tape speed of the system or may be set as the maximum speed that matches the host computer data transfer rate.

With the prior art method, no real off-track error correction or prevention steps are taken, and the tape controller, in effects, assumes the error will go away/stay away so that writing can progress. Because no error correction steps are taken, off-track errors in conventional systems frequently repeat themselves many times and result in fatal errors.

Referring to the prior art method shown in FIG. 2, writing starts at the maximum target speed, while the off-track sensing system continuously checks for off-track errors. If no off-track error is sensed, writing continues until all data are written, and the writing job ends. If off-track errors are sensed, writing is stopped while the tape continues to travel at full speed and the error sensing system continues to check for off-track conditions. Usually, off track errors are caused by vibrations or other periodic causes, and head will typically move quickly back on-track after an off-track error. In the conventional system, therefore, writing starts again soon after the off-track error, but, without any speed adjustment, the off-track error often occurs repeatedly, so that writing is interrupted time after time, during retry after retry. If the off-track errors persist and less than 100–110 mm of data written in 4 meters of tape, the write job ends, unfinished. In the conventional system, writing is started after each off-track error, but the system is still prone to off-track errors for the reasons that caused the initial error occurrence(s).

Referring to FIGS. 3 and 4, the present invention responds differently to off-track errors. The off-track error limit is preferably set at a distance within the range of 10–20% of the track width, that is, preferably about 2.8–5.6 $\mu$cm for a 28 $\mu$m wide track. The invented response comprises slowing tape speed, which is an error correction step that is likely to help alleviate the problem causing the off-track error. The great speed of standard linear tape travel (in this example, is 4.1 m/s) makes the tape prone to wander relative to the head, and the inventor believes that speed reduction is a key to correcting off-track errors and allowing writing to continue successfully. Preferably, because the head usually may be brought on-track quickly after an off-track error, and because speed reduction prevents subsequent off-track errors in most instances, writing may continue after speed reduction or, more preferably, during the speed reduction. Preferably, writing continues at reduced or reducing speed to finish the data-set (usually about 100–110 mm of data) without interruptions caused by further off-track errors. Once the particular data-set is written, the tape speed is preferably accelerated for writing of the next data-set, either to the original, maximum speed or to another target speed that is preferably the maximum allowed target speed. The maximum allowed target speed is the maximum speed that is permissible based on the other criteria imposed by the tape system controller, for example, maximum speed compatible with external environmental conditions, or the maximum speed compatible with the host computer.

Comparing the methods in FIGS. 2 and 3, one may see that normal, error-free writing in the prior art system and the invented system are similar or the same. The response of the invented system to an off-track error, however, is different from in the prior art. In the less-preferred embodiment of the invention of FIG. 3, the tape controller stops writing and reduces the tape speed incrementally to a first reduced speed that is less than the original target speed. For example, the speed may be reduced from a target of 4.1 m/s to a target of 3.5 m/s. This may be done quickly and writing may resume immediately, assuming that the head has moved back on-track. If an off-track error recurs, then the tape controller reduces speed again, for example, to a second reduced speed of 3.0 m/s. This process, which may be called the "speed reduction-error-sensing" loop or the "retry" loop, may be repeated until a data-set is successfully written, as long as the retry criteria are satisfied. In FIG. 3, the retry criteria comprise questioning whether 4 meters have been used in trying to write the data-set. If 4 meters have been used, the write fails; if 4 meters have not been used, then another retry is permitted. Also, if enough retries have been performed that the tape speed has been incrementally reduced to the minimum speed, but 4 meters have not been used, then additional retries are made without any more speed adjustment.

Once a data-set is written, the tape speed is preferably accelerated to the maximum target speed, for example 4.1 m/s, and the writing of the next data-set is started. For systems that cannot write during a tape speed change, writing is stopped while this acceleration is conducted and then writing commences. For systems that can write during a tape speed change, writing commences during acceleration. In the event that an off-track error occurs again, the speed reduction and retry process starts again. Thus, while tape speed may be reduced while writing any data-set experiencing off-track errors, writing of subsequent data-sets is started preferably during acceleration or after acceleration to the maximum target speed. Alternatively, instead of accelerating for subsequent data-sets, writing of the subsequent data-sets may be done at reduced speed or an intermediate speed.

The speed in the less-preferred embodiment of FIG. 3 is typically reduced incrementally, for example, in 0.5 m/s increments or other increments found to be advantageous, from preferably about 4.1 down to about 1.6 m/s. If the lowest possible writing speed is reached and the off-track errors persist so that the data-set cannot be written within the desired tape length, the system will signal a write failure. As alternatives to the requirement that a data-set must be written in a certain length of tape, other "retry criteria" may be set for allowing subsequent retries. For example, a maximum number of allowable retries may be set as the criteria, so that the data-set writing process fails if not completed within that number of retries. In the step in FIG. 3 labeled "Retry Criteria," therefore, there may be one or more criteria that decide whether retries can proceed, based on the manufacturer/designer's preferred methods of managing time and tape usage during the writing process.

Referring to an especially-preferred embodiment in FIG. 4, one may see that this method is similar to the method portrayed in FIG. 3, except that the retry loop is modified. Speed reduction, herein also called deceleration, is done continuously rather than in discreet increments. When an off-track error is sensed, writing is stopped for a fraction of a second while the head comes back on track, which typically takes only a few milliseconds because the vibration, reel inconsistency, or tape packing inconsistency passes quickly. Concurrently with writing stoppage, the tape speed begins to decelerate. As soon as the head goes back on track, writing resumes while deceleration continues. Deceleration continues while the first retry of the data-set writing progresses, and, if off-track errors recur, also during subsequent retries. The controller may execute many writing retries, during the time it takes to decelerate from the target tape speed to the minimum tape speed. Preferably, the entire data-set is successfully written within the allowed length of tape with one or more retries, while deceleration continues throughout the retry/retries. Deceleration is preferably about 4 m/s$^2$, but may be other another rate, for example, in the range of about 1–5 m/s$^2$.

Preferably, deceleration is started as soon as the first off-track error occurs. Alternatively, one retry at target speed may be attempted, and, if the first retry is not successful, tape speed is then decelerated during second and subsequent retries.

In FIG. 4, if the data-set is successfully written in the allowed tape length, then another data-set is started. As the next data-set is started, tape speed is preferably accelerating to the maximum target speed. Writing and acceleration continue simultaneously unless off-track errors occur again, and then, the process is started all over again, that is, writing is stopped until the head is on-track, and deceleration and retries begin again. The invented system may take advantage of the tendency of off-track errors to be reduced or eliminated by deceleration so that writing progresses without further interrupting writing. This way, the invented writing system progresses efficiently and only interrupts writing if off-track errors persist in spite of the slower, decelerating tape speed.

In the especially-preferred embodiment of FIG. 4, tape operation is more continuous, and less stop-and-start, which itself can help with off-track error reduction. A continuous range of speeds is available to help prevent/correct off-track errors, rather than a few incremental adjustments within the possible range. Optionally, but less preferably, as part of the off-track error correction method, the tape may be reversed to back the tape up (not shown in Figures) to a position where writing was stopped.

In the embodiment of FIG. 4, as discussed above for the embodiment of FIG. 3, alternative "retry criteria" may be set. For example, rather than an allowable length of tape, a maximum number of allowable retries may be set as the criteria, so that, if a data-set is not successfully written in that number of retries, the data-set writing process fails.

The preferred methods, therefore, respond by entering a deceleration mode in response to off-track errors. This approach of decelerating throughout the writing retries is an effective way to reduce off-track errors and interruptions without complex control logic steps. Entering the retry loop, therefore, is as if a "deceleration switch" is flipped, by the off-track error, to enter deceleration mode. Leaving the retry loop once a data-set is written, preferably but not necessarily, is as if an "acceleration switch" is flipped, to accelerate the tape during writing until a higher target speed is reached. This approach targets the problems caused by high tape speeds, without unnecessarily wasting time and tape length.

The invention provides ways to solve or reduce off-track errors in tape writing, with a minimum effect on transfer time for a data-file onto the tape. By taking corrective action to correct the off-track error after the first off-track error in a data-set write job, the chances of successful writing, in a minimum amount of time and without further off-track errors, is greatly enhanced. Error correction is started early and is continued through subsequent errors. The invented methods tend to be more efficient than the prior art, even though average tape speed may be lower, because fewer stops, starts, and retries are needed and fewer write failures are experienced.

Technology is known in the art to adjust tape speed, although this technology has been tied to adjusting tape speed to match the speed of data being made available by the host computer. Conventional tape speed control hardware and programming known to those of skill in the art may be adapted, once this disclosure is seen and understood, to accomplish the invented methods of off-track error correction/reduction by speed control. In the case of the embodiment of FIG. 3 and others, incremental speed adjustment in response to off-track errors is preferred. In the case of the embodiment of FIG. 4 and others, continuous speed adjustment in response to off-track errors is preferred.

Although this invention has been described above with reference to particular means, materials and embodiments, it is to be understood that the invention is not limited to these disclosed particulars, but extends instead to all equivalents within the scope of the following claims.

We claim:

1. A method of off-track error correction in a data storage tape writing operation, the method comprising:

writing data onto a tape with a writing head at a target tape speed;

sensing a first off-track error in which the writing head reaches an off-track limit;

stopping writing until the head moves on-track;

reducing tape speed when the first off-track error is sensed; and resuming writing at reduced tape speed.

2. A method as in claim 1, wherein the step of resuming writing is done during the step of reducing tape speed.

3. A method as in claim 1 wherein the step of resuming writing is done after the step of reducing tape speed.

4. A method as in claim 1 wherein the step of reducing tape speed is done by reducing tape speed an incremental amount, and wherein the step of resuming writing is done after incrementally reducing tape speed.

5. A method as in claim 1 comprising sensing for off-track errors continuously during said reducing of tape speed.

6. A method as in claim 1, comprising, after the step of resuming writing, sensing a second off-track error and stopping writing again until the head goes back on-track, and incrementally further reducing tape speed and resuming writing again after said further tape speed reduction.

7. A method as in claim 1 comprising, after the step of resuming writing, sensing a second off-track error, stopping writing again until the head goes back on-track, and then further reducing tape speed further while concurrently resuming writing onto the tape.

8. A method as in claim 1 wherein the step of resuming writing comprises finishing writing of a data-set while reducing tape speed, and wherein the method further comprises accelerating tape speed while writing a subsequent data-set.

9. A method as in claim 1 wherein the step of reducing tape speed is done at a deceleration rate in the range of 1–5 m/s$^2$.

10. A method as in claim 1 wherein the tape is part of a linear tape system.

11. A method of off-track error reduction in a data storage tape writing operation, the method comprising:

writing a data-set onto a tape at a target tape speed;

sensing a first off-track error when a writing head reaches an off-track limit a certain distance from a center of a track;

stopping writing until the writing head is closer to the center of the track than the off-track limit;

reducing tape speed below the target tape speed in response to said sensing of the first off-track error; and resuming writing the data-set while tape speed is being reduced.

12. The method as in claim 11, wherein reducing tape speed is done as soon as writing is stopped in response to the first off-track error.

13. The method as in claim 11, wherein reducing tape speed is done as soon as the first off-track error is sensed.

14. The method as in claim 11, further comprising writing an entire data-set during said reducing of tape speed.

15. The method as in claim 11, wherein said reducing tape speed is done until the tape speed is at a predetermined minimum speed.

16. The method as in claim 15, further comprising stopping writing each time an off-track error is sensed and resuming writing at said minimum speed each time the writing head goes back on-track.

17. The method as in claim 11, wherein said resuming writing data from the data-set comprises writing the entire data-set, and wherein the method further comprises accelerating tape speed after the entire data-set is written and writing a next data-set in a file during said acceleration.

18. The method of claim 11, further comprising:

sensing a subsequent off-track error after said resuming writing;

stopping writing after sensing the subsequent off-track error until the writing head moves on-track;

further reducing tape speed in response to said sensing of the subsequent off-track error; and resuming writing data from the data-set while tape speed is being further reduced.

19. The method of claim 18, further comprising signaling a writing failure and stopping writing of data if a data-set is not written within a predetermined length of tape.

20. The method of claim 18, wherein said certain distance of the off-track limit from the center of a track is 10–20% of width of the track.

* * * * *